United States Patent
Kugel

(10) Patent No.: US 7,640,883 B2
(45) Date of Patent: Jan. 5, 2010

(54) FLUID-OPERATED COMMUNICATION SYSTEM

(76) Inventor: Moshe Kugel, 544 Empire Blvd., Brooklyn, NY (US) 11225

( * ) Notice: Subject to any disclaimer, the term of this patent is extended or adjusted under 35 U.S.C. 154(b) by 274 days.

(21) Appl. No.: 11/774,614

(22) Filed: Jul. 9, 2007

(65) Prior Publication Data

US 2008/0253541 A1    Oct. 16, 2008

Related U.S. Application Data

(63) Continuation of application No. 10/992,723, filed on Nov. 22, 2004, now abandoned.

(51) Int. Cl.
*G10K 1/068* (2006.01)

(52) U.S. Cl. .................. 116/200; 116/10; 116/151; 40/460; 70/432

(58) Field of Classification Search .......... 116/200, 116/10, 142 FP, 151, DIG. 7, DIG. 12, 85–86; 216/31; 60/567; 16/402; 70/DIG. 50, 70, 70/432; 109/21; 246/260; 40/459, 460
See application file for complete search history.

(56) References Cited

U.S. PATENT DOCUMENTS

| | | | | |
|---|---|---|---|---|
| 55,378 A * | 6/1866 | Simpson | ............... | 116/7 |
| 148,362 A * | 3/1874 | Guattari | ............ | 116/151 |
| 227,403 A * | 5/1880 | Baker | ............ | 40/460 |
| 357,699 A * | 2/1887 | Colby | ............ | 116/151 |
| 358,363 A * | 2/1887 | Maloney | ............ | 116/151 |
| 456,824 A * | 7/1891 | Hunt | ............ | 116/151 |
| 588,149 A * | 8/1897 | Hinckley | ............ | 40/460 |
| 941,695 A * | 11/1909 | Simpson | ............ | 40/459 |
| 1,081,190 A * | 12/1913 | Arita | ............ | 40/460 |
| 1,099,106 A * | 6/1914 | Wevat | ............ | 40/460 |
| 1,216,899 A * | 2/1917 | Weyer | ............ | 40/460 |
| 1,474,925 A * | 11/1923 | Billger | ............ | 91/229 |
| 3,410,088 A * | 11/1968 | Cohen et al. | ............ | 60/567 |
| 4,023,151 A * | 5/1977 | Markham | ............ | 340/692 |
| 5,951,205 A * | 9/1999 | Chen | ............ | 405/186 |
| 6,755,147 B2 * | 6/2004 | Katz | ............ | 116/27 |
| 6,967,587 B2 * | 11/2005 | Snell et al. | ............ | 340/686.6 |
| 2005/0098082 A1 * | 5/2005 | Beal | ............ | 116/151 |

* cited by examiner

*Primary Examiner*—R. A. Smith
*Assistant Examiner*—Tania C Courson
(74) *Attorney, Agent, or Firm*—Dekel Patent Ltd.; David Klein

(57) ABSTRACT

A communication system including a fluid-operated calling device mounted in a first location in a building, and a fluid-operated indicator mounted in a second location in a building and in fluid communication with the fluid-operated calling device, wherein actuation of the fluid-operated calling device causes the fluid-operated indicator to provide an indication that the fluid-operated calling device has been actuated. A fluid-operated lock may be mounted near the fluid-operated calling device and in fluid communication with a fluid-operated actuator, wherein actuation of the fluid-operated actuator causes opening of the fluid-operated lock.

8 Claims, 2 Drawing Sheets

FLUID-OPERATED COMMUNICATION SYSTEM

CROSS-REFERENCE TO RELATED APPLICATIONS

This application is a continuation of and claims priority from U.S. patent application Ser. No. 10/992,723, filed Nov. 22, 2004 now abandoned.

FIELD OF THE INVENTION

The present invention relates generally to in-house communication systems for communicating between locations in a building, such as intercoms and hospital bed paging systems, and particularly to a pneumatically or hydraulically operated system for communicating between locations in a building.

BACKGROUND OF THE INVENTION

Communication systems for communicating between locations in a building are well known. For example, intercoms are used to communicate between persons wishing to enter an apartment or office building and the occupants of the building. Typically, the person wishing to enter the building presses an electric buzzer which sounds in the room of the occupants, thereby notifying them that a person wishes to gain entrance. The occupants then press a button that electrically opens a latch or some locking mechanism of the entrance door to the building, thereby permitting the person to enter.

Another example of such communication systems is a hospital bed paging system. Typically a patient is provided with a handheld device with a call button. The patient may press the button which electrically signals the nurse or other caretaker that the patient needs assistance of some kind.

The known communication systems for communicating between locations in a building are electrically operated. However, this may pose problems in certain situations. For example, if there is a power outage and no auxiliary generator power is available, the communication system cannot operate. As another example, for religious or logistic reasons, there may be times when it is not permissible to use electricity.

SUMMARY OF THE INVENTION

The present invention seeks to provide a fluid-operated (that is, pneumatically and/or hydraulically operated) system for communicating between locations in a building, as is described more in detail hereinbelow.

There is provided in accordance with an embodiment of the present invention a communication system including a fluid-operated calling device which may be mounted in a first location in a building, and a fluid-operated indicator which may be mounted in a second location in a building and in fluid communication with the fluid-operated calling device, wherein actuation of the fluid-operated calling device causes the fluid-operated indicator to provide an indication that the fluid-operated calling device has been actuated. A fluid-operated lock may be mounted near the fluid-operated calling device and in fluid communication with a fluid-operated actuator, wherein actuation of the fluid-operated actuator causes opening of the fluid-operated lock. The fluid-operated actuator may be mounted in the same room as the fluid-operated indicator.

In accordance with an embodiment of the present invention, a lock-open indicator may be associated with the fluid-operated lock and actuable by the fluid-operated lock and/or the fluid-operated actuator, wherein actuation of the lock-open indicator provides an indication that the fluid-operated lock is open.

Further in accordance with an embodiment of the present invention, the fluid-operated indicator and/or the lock-open indicator may include a fluid-operated shutter, which in a nominal position blocks viewing a visual indication, wherein actuation of the fluid-operated shutter includes movement of the fluid-operated shutter to permit viewing the visual indication. The visual indication may include a flashing light beam or a colored surface having a different color than an outer surface of the fluid-operated shutter.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
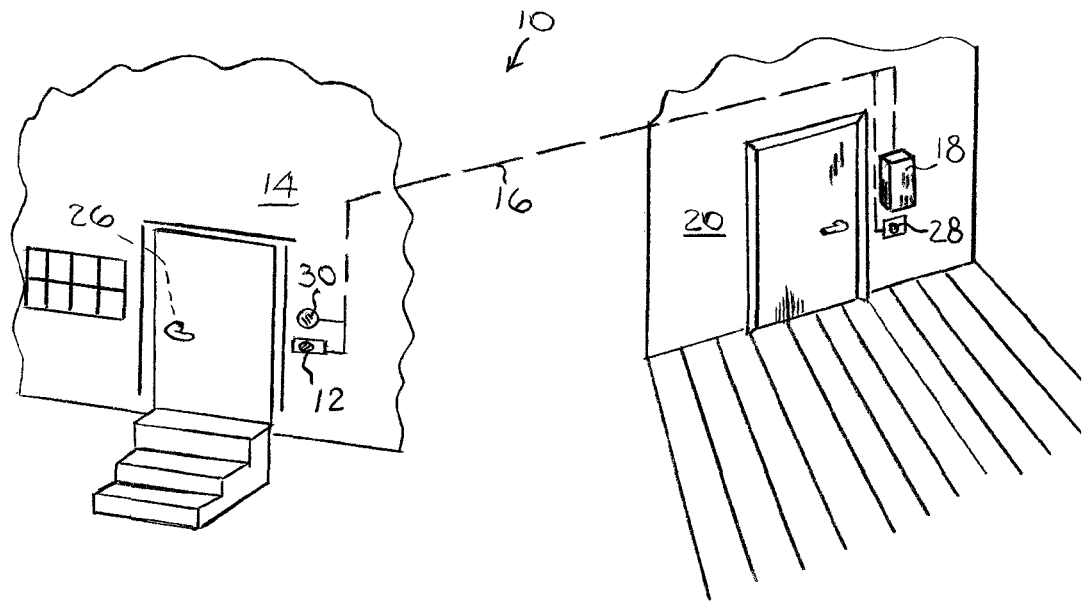
FIG. 1 is a simplified pictorial illustration of a communication system, constructed and operative in accordance with an embodiment of the present invention.
Figure 2:
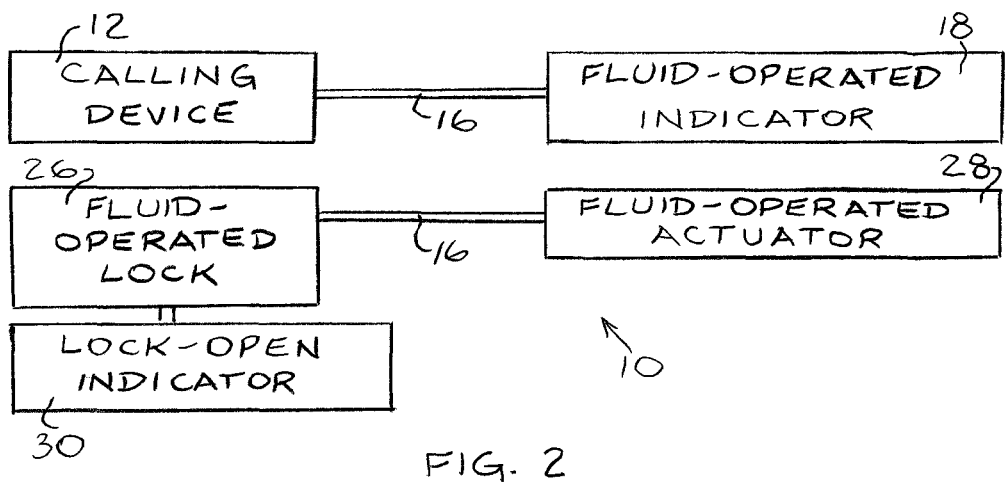
FIG. 2 is a simplified block diagram of the communication system of FIG. 1.

Reference is now made to FIGS. 1 and 2, which illustrate a communication system 10, constructed and operative in accordance with an embodiment of the present invention. The invention is described hereinbelow for an intercom system in a building, but it is appreciated that the invention is not limited to intercom systems, and also encompasses any in-house communication system, such as but not limited to, hospital bed paging systems, hotel paging systems, office building communication systems between rooms and many others.

The communication system 10 may include a fluid-operated calling device 12, which may be mounted in a first location 14 in a building, such as at an entrance door. The fluid-operated calling device 12 may comprise, without limitation, a push button air valve, commercially available from such manufacturers as SMC, St. Paul, Minn. (standard or miniature series, for example) or Clippard International. The fluid-operated calling device 12 may be in fluid communication, such as via tubing 16, with a fluid-operated indicator 18 mounted in a second location 20 in the building, such as on a wall in an apartment. The fluid-operated indicator 18 may comprise, without limitation, a fluid-operated shutter 22, which in a nominal position blocks viewing a visual indication 24 (seen in FIG. 3). Upon actuation of the fluid-operated calling device 12, the fluid-operated shutter 22 moves to permit viewing the visual indication 24. The fluid-operated shutter 22 may be operated, without limitation, by means of an air solenoid, for example, commercially available in a wide variety of configurations from many manufacturers, e.g., Eaton Aeroquip. The visual indication 24 may be a flashing light beam, such as an incandescent flashing light, but the invention is not limited to this example.

A fluid-operated lock 26 may be mounted near the fluid-operated calling device 12, and may be in fluid communication with a fluid-operated actuator 28, which may be mounted near the fluid-operated indicator 18. Actuation of the fluid-operated actuator 28 causes opening of the fluid-operated lock 26. A suitable example of the fluid-operated lock 26 is the AIRLOCK 9400, commercially available from Airteq Systems, 1965 Mitchell Young Road, Montgomery, Ala., which is a medium security, remote-controlled, mortised-dead-latch pneumatic lock for 2-inch door frame installation. A pneumatic remote control unit with push button (e.g., available from Airteq or SMC) may serve as the fluid-operated actuator 28.

A lock-open indicator 30 may be associated with the fluid-operated lock 26 and may be actuated by the fluid-operated lock 26 and/or the fluid-operated actuator 28. The lock-open indicator 30 provides an indication when the fluid-operated lock 26 is open. The lock-open indicator 30 may comprise, without limitation, the Air Indicator unit, commercially available from SMC. The Air Indicator has a lens which displays clear in the absence of pressure and displays bright when activated at approximately 5 PSI (this is a non-limiting example of air pressure, and the communication system 10 may be charged to and operate at any other suitable air or hydraulic pressure). Air Indicators are available with red or green display and black or gray panel mount bezel. The Air Indicator is another example of a fluid-operated shutter, which in a nominal position blocks viewing a visual indication, wherein movement of the shutter permits viewing the visual indication. In this example, the visual indication includes a colored surface of a different color (e.g., red or green) than an outer surface of the fluid-operated shutter (e.g., black or gray).

It is noted that alternatively the fluid-operated indicator 18 may comprise an Air Indicator and the like, and the lock-open indicator 30 may comprise a flashing light beam with shutter and the like, and of course may include other types of fluid-operated indicators.

FIGS. 1 and 2 illustrate the communication system 10 before use thereof.

Figure 3:
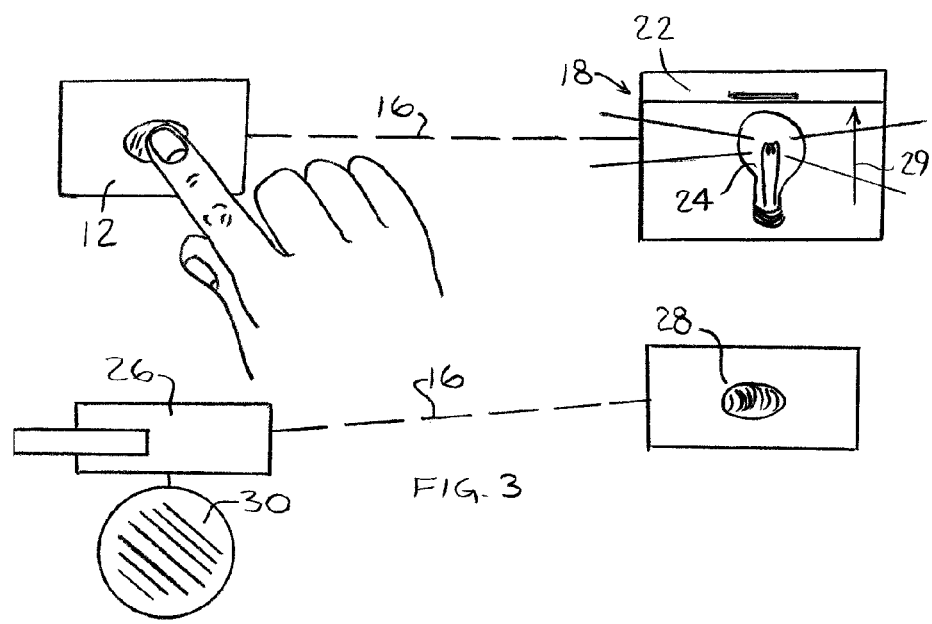
FIG. 3 is a simplified illustration of the communication system of FIG. 1, wherein a person wishing to gain entry into a building actuates a fluid-operated calling device which causes a fluid-operated indicator to provide an indication that the fluid-operated calling device has been actuated.

Reference is now made to FIG. 3. A person wishing to enter the building may press the fluid-operated calling device 12. This may cause the fluid-operated shutter 22 to move, as indicated by arrow 29, thereby permitting viewing the visual indication 24 (e.g., flashing light). The occupant of the room where the fluid-operated indicator 18 is installed sees the visual indication 24 and realizes that a person wishes to enter the building.

Figure 4:
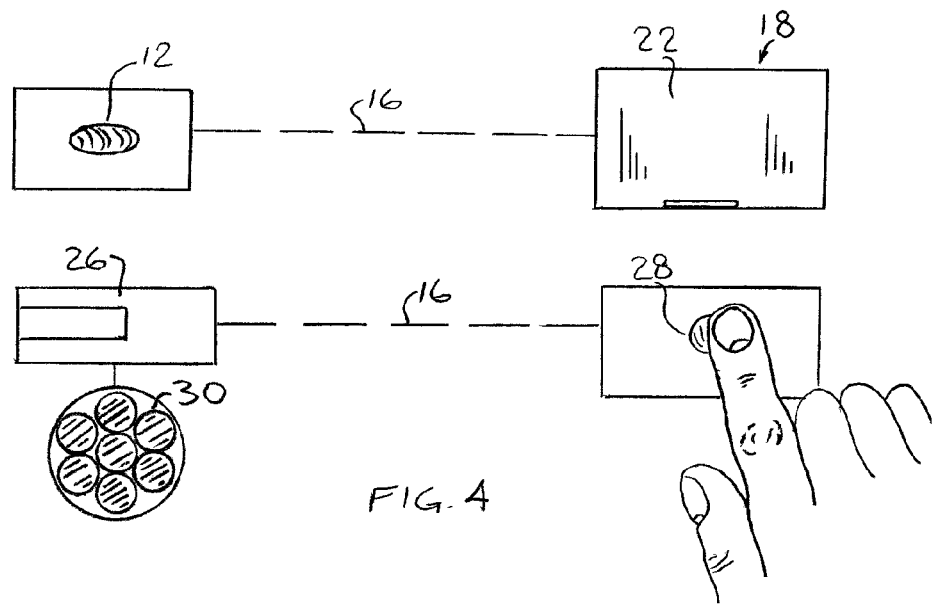
FIG. 4 is a simplified illustration of the communication system of FIG. 1, wherein an occupant of the building actuates a fluid-operated actuator, which causes opening of a fluid-operated lock and indication of the lock being open.

Reference is now made to FIG. 4. The occupant may press the fluid-operated actuator 28, which causes the fluid-operated lock 26 to open, thereby permitting the person to enter the building. The person wishing to enter the building realizes that the lock 26 is open by means of the lock-open indicator 30.

It will be appreciated by persons skilled in the art that the present invention is not limited to pneumatics and may also comprise hydraulic components. It is also appreciated that the communication system 10 may be redundantly powered by electricity.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for operating an intercom comprising:
   providing a fluid-operated intercom calling device mountable in a first location at an entrance door to a building;
   providing a fluid-operated indicator mountable in a second location in said building and in fluid communication with said fluid-operated intercom calling device; and
   a first person non-electrically actuating said fluid-operated intercom calling device to cause said fluid-operated indicator to provide an indication to a second person that said fluid-operated intercom calling device has been actuated, wherein said second person, upon receiving the indication that said fluid-operated intercom calling device has been actuated, operates a fluid-operated actuator to permit the first person to enter through the entrance door of the building.

2. The method according to claim 1, further comprising providing another fluid-operated indicator that gives an indication to the first person that the entrance door is open.

3. The method according to claim 1, wherein said fluid-operated actuator operates said fluid-operated indicator.

4. The method according to claim 1, wherein said fluid-operated indicator comprises a fluid-operated shutter, which in a nominal position blocks viewing a visual indication, wherein actuation of said fluid-operated shutter comprises movement of said fluid-operated shutter to permit viewing the visual indication.

5. The method according to claim 4, wherein said visual indication comprises a flashing light beam.

6. The method according to claim 4, wherein said visual indication comprises a colored surface of a different color than an outer surface of said fluid-operated shutter.

7. An intercom comprising:
   a fluid-operated intercom calling device mounted in a first location at an entrance door to a building;
   a fluid-operated indicator mounted in a second location in said building and in fluid communication with said fluid-operated intercom calling device, wherein said fluid-operated intercom calling device is non-electrically actuable by a first person to cause said fluid-operated indicator to provide an indication to a second person that said fluid-operated intercom calling device has been actuated; and
   a fluid-operated actuator operable by the second person to permit the first person to enter through the entrance door of the building.

8. The apparatus according to claim 7, further comprising another fluid-operated indicator that gives an indication to the first person that the entrance door is open.

* * * * *